US010636007B2

(12) United States Patent
Runkana et al.

(10) Patent No.: US 10,636,007 B2
(45) Date of Patent: Apr. 28, 2020

(54) METHOD AND SYSTEM FOR DATA-BASED OPTIMIZATION OF PERFORMANCE INDICATORS IN PROCESS AND MANUFACTURING INDUSTRIES

(71) Applicant: TATA CONSULTANCY SERVICES LIMITED, Mumbai (IN)

(72) Inventors: Venkataramana Runkana, Pune (IN); Rohan Pandya, Pune (IN); Rajan Kumar, Pune (IN); Aniruddha Panda, Pune (IN); Mahesh Mynam, Pune (IN); Sri Harsha Nistala, Pune (IN); Pradeep Rathore, Pune (IN); Jayasree Biswas, Pune (IN)

(73) Assignee: Tata Consultancy Services Limited, Mumbai (IN)

( * ) Notice: Subject to any disclaimer, the term of this patent is extended or adjusted under 35 U.S.C. 154(b) by 107 days.

(21) Appl. No.: 15/978,845

(22) Filed: May 14, 2018

(65) Prior Publication Data

US 2018/0330300 A1 Nov. 15, 2018

(30) Foreign Application Priority Data

May 15, 2017 (IN) .............................. 201721009012

(51) Int. Cl.
*G06Q 10/06* (2012.01)
*G06F 17/18* (2006.01)
(Continued)

(52) U.S. Cl.
CPC ....... *G06Q 10/06393* (2013.01); *G05B 15/02* (2013.01); *G05B 17/02* (2013.01); *G06F 17/18* (2013.01); *G06Q 10/06* (2013.01)

(58) Field of Classification Search
CPC .. G06Q 10/06393; G06Q 10/06; G06Q 10/04; G06F 17/18; G05B 15/02; G05B 17/02; G06K 9/6218
See application file for complete search history.

(56) References Cited

U.S. PATENT DOCUMENTS 9,261,865 B2 * 2/2016 Morrison ............... F25J 3/0219
2002/0077711 A1 6/2002 Nixon et al.
(Continued)

FOREIGN PATENT DOCUMENTS

WO WO2008133715 A2 11/2008

OTHER PUBLICATIONS

Author: Sathyan Munirathinam and Balakrishnan Ramadoss Title: Predictive Models for Equipment Fault Detection in the Semiconductor Manufacturing Process Title of the item: IACSIT International Journal of Engineering and Technolog Date: Aug. 2016 Volume—issue number(s): vol. 8, No. 4 Publisher: IACSIT International Journal of Engineering and Technology Link: http://www.ijetch.org/vol8/898-T10023.pdf.
(Continued)

*Primary Examiner* — Charles R Kasenge
(74) *Attorney, Agent, or Firm* — Finnegan, Henderson, Farabow, Garrett & Dunner LLP

(57) ABSTRACT

A system and method for performing data-based optimization of performance indicators of process and manufacturing plants. The system consists of modules for collecting and merging data from industrial processing units, pre-processing the data to remove outliers and missingness. Further, the system generates customized outputs from data and identifies important variables that affect a given process performance indicator. The system also builds predictive models for key performance indicators comprising the important features and determines operating points for optimizing the key performance indicators with minimum user intervention. In particular, the system receives inputs from users on the key performance indicators to be optimized and notifies the users of outputs from various steps in the analysis that help the users to effectively manage the analysis and take appropriate operational decisions.

19 Claims, 15 Drawing Sheets

(51) Int. Cl.
  *G05B 15/02*  (2006.01)
  *G05B 17/02*  (2006.01)

(56) References Cited

U.S. PATENT DOCUMENTS

| | | | |
|---|---|---|---|
| 2007/0059838 A1* | 3/2007 | Morrison | F25J 3/0219 436/55 |
| 2010/0161133 A1* | 6/2010 | Morrison | F25J 3/0219 700/269 |
| 2013/0179235 A1* | 7/2013 | Treiber | G05B 11/32 705/7.41 |
| 2015/0278407 A1 | 10/2015 | Vennelakanti et al. | |

OTHER PUBLICATIONS

Author: David Lechevalier ; Anantha Narayanan ; Sudarsan Rachuri Title: Towards a domain-specific framework for predictive analytics in manufacturing Title of the item; Big Data (Big Data), 2014 IEEE International Conference on Date: Oct. 27-30, 2014 Publisher: IEEE Link: https://ws680.nist.gov/publication/get_pdf.cfm?pub_id=916274.

* cited by examiner

METHOD AND SYSTEM FOR DATA-BASED OPTIMIZATION OF PERFORMANCE INDICATORS IN PROCESS AND MANUFACTURING INDUSTRIES

PRIORITY CLAIM

The U.S. patent application claims priority under 35 U.S.C. § 119 to: India Application No. 201721009012, filed on May 15, 2017. The entire contents of the aforementioned application are incorporated herein by reference.

TECHNICAL FIELD

The embodiments herein generally relates to the field of data analytics and specifically to a system and method for optimizing key performance indicators of process and manufacturing industries.

BACKGROUND

Indicators such as productivity, product quality, energy consumption, percentage uptime, emission levels etc. are used to monitor the performance of manufacturing industries and process plants. Industries today face the challenge of meeting ambitious production targets, minimizing their energy consumption, meeting emission standards and customizing their products, while handling wide variations in raw material quality and other influencing parameters such as ambient temperature, humidity etc. Industries strive to continuously improve their performance indicators by modulating few parameters that are known to influence or affect them. This is easy when a process involves limited number of variables. However, most industrial processes consists of many units in series and/or parallel and involve thousands of variables or parameters. Identification of variables that influence key performance indicators (KPIs) and (their) optimum levels in such situations is not straightforward, and doing the same requires a lot of time and expertise. Data analytics methods such as statistical techniques, machine learning and data mining have the potential to solve these complex optimization problems, and can be used to analyze industrial data and discover newer regimes of operation.

Identification of the relevant variables that affect KPIs is a challenge associated with process data analytics. This is due to the large number of variables in industrial processes and complex nonlinear interactions among them. There are several variable (or feature) selection techniques but no single variable selection technique is capable of identifying all the relevant variables, particularly in complex industrial processes. There is, therefore, a need for a better variable selection technique that is capable of selecting the most important variables.

Furthermore, in all the methods that describe application of data analytics to manufacturing and process industries, the focus is limited to visualization of the KPIs, other variables of interest and results from predictive models, and/or providing process recommendations to the end user. Several other outputs such as ranges of variables that correspond to desired and undesired ranges of KPIs, ranges of KPIs at different throughput levels, etc. that are immense help of end users in decision making do not feature in any of the existing methods.

SUMMARY

The following presents a simplified summary of some embodiments of the disclosure in order to provide a basic understanding of the embodiments. This summary is not an extensive overview of the embodiments. It is not intended to identify key/critical elements of the embodiments or to delineate the scope of the embodiments. Its sole purpose is to present some embodiments in a simplified form as a prelude to the more detailed description that is presented below.

In view of the foregoing, an embodiment herein provides a system and method for analyzing a plurality of data from one or more industrial processing units for optimizing the key performance indicators of the industry.

In one aspect, the following presents a system for analyzing a plurality of data from one or more industrial processing units for optimizing the key performance indicators of the industry. The system comprises a memory with instructions, at least one processor communicatively coupled with the memory, a plurality of interfaces and a plurality of modules. A receiving module is configured to receive the plurality of data of one or more industrial processing units, wherein the plurality of data comprising of characteristics of raw materials, characteristics of intermediate products, by-products and end products, process parameters and condition of process equipment. A unit level fusion module is configured to merge the received plurality of data to obtain unit-wise dataset of each of the one or more industrial processing units, wherein the unit-wise dataset of each processing unit comprising of a desired sampling frequency. A verification module is configured to verify the merged unit-wise dataset of the one or more industrial processing units, wherein presence of absurd values, percentage availability, standard deviation and inter-quartile range of all the variables of the processing unit are calculated. A data pre-processing module is configured to pre-processing the verified plurality of data to obtain pre-processed dataset of each of the one or more industrial processing units, wherein the pre-processing is an iterative process comprising the steps of outlier removal, imputation of missing values and clustering. An enterprise level fusion module is configured to integrate the pre-processed data of each of the one or more industrial processing units with one or more values of simulated variables of one or more physics based models, and one or more domain inputs from user to obtain enterprise level dataset, wherein the unit-wise datasets are merged and synchronized taking into account the time lags due to residence times in various units, times of transportation between one or more industrial processing units and response time of one or more sensors of the processing units. A regime identification module is configured to identify one or more operating regimes using one or more clustering techniques on the enterprise level dataset, wherein one or more clustering techniques comprising of distance based clustering, density based clustering and hierarchical clustering. A baseline statistics module is configured to determine ranges of one or more variables corresponding to the KPIs of the enterprise level dataset. The range determination is based on predefined baseline statistics and the one or more operating regimes, wherein the determined ranges of one or more variables is being used to generate one or more plots of KPIs during the time period for which analysis is being carried out. A feature selection module is configured to select one or more features of the enterprise level dataset to obtain a superset of one or more selected features of the enterprise level dataset, wherein the feature selection is performed on all the regime-wise datasets as well as the enterprise level dataset. A model building module is configured to develop one or more predictive models for each KPI, wherein the one or more predictive models is developed using enterprise level dataset and the superset of one or more selected features of the enterprise level dataset. An optimization module is configured to optimize at least one KPI based on one or more predictive models and constraints on the one or more KPIs using one or more optimization techniques, wherein one or more optimization techniques includes gradient search, linear programming, goal programming, simulated annealing and evolutionary algorithms.

In another aspect, the following presents a method for analyzing a plurality of data from one or more industrial processing units for optimizing the key performance indicators of the industry. The method comprising steps of receiving the plurality of data of one or more industrial processing units, wherein the plurality of data comprising of characteristics of raw materials, characteristics of intermediate products, by-products and end products, process parameters and condition of process equipment, merging the received plurality of data to obtain unit-wise dataset of each of the one or more industrial processing units, verifying the merged unit-wise dataset of the one or more industrial processing units, wherein presence of junk values, percentage availability, standard deviation and inter-quartile range of all the variables of the processing unit are calculated, pre-processing the verified plurality of data to obtain pre-processed dataset of each of the one or more industrial processing units, wherein the pre-processing is an iterative process comprising the steps of outlier removal, imputation of missing values and clustering, integrating the pre-processed datasets of each of the one or more industrial processing units with one or more values of simulated variables of one or more physics-based models, and one or more domain inputs from user to obtain enterprise level dataset, wherein the unit-wise datasets are merged and synchronized taking into account the time lags due to residence times in various units, times of transportation of materials from one or more industrial processing units and response time of one or more sensors of the processing units, identifying one or more operating regimes using one or more clustering techniques on the enterprise level dataset, wherein one or more clustering techniques comprising of distance based clustering, density based clustering and hierarchical clustering, determining ranges of one or more variables corresponding to the KPIs of the enterprise level dataset based on predefined baseline statistics and the one or more operating regimes, wherein the determined ranges of one or more variables is being used to generate one or more plots of KPIs during the time period of analysis is being carried out, selecting one or more features of the enterprise level dataset to obtain a superset of one or more selected features of the enterprise level dataset, wherein the feature selection is performed on all the regime-wise datasets as well as the enterprise level dataset, developing one or more predictive models for each KPI, wherein the one or more predictive models using enterprise level dataset and the superset of one or more selected features of the enterprise level dataset and optimizing at least one KPI based on one or more predictive models and constraints on the one or more KPIs using one or more optimization techniques, wherein one or more optimization techniques includes gradient search, linear programming, goal programming, simulated annealing and evolutionary algorithms.

In yet another aspect, the embodiment herein provides one or more non-transitory machine readable information storage mediums comprising one or more instructions, which when executed by one or more hardware processors perform actions comprises receiving a plurality of data of one or more industrial processing units, wherein the plurality of data comprising of characteristics of raw materials, characteristics of intermediate products, by-products and end products, process parameters and condition of process equipment, merging the received plurality of data to obtain unit-wise dataset of each of the one or more industrial processing units, verifying the merged unit-wise dataset of the one or more industrial processing units, wherein presence of junk values, percentage availability, standard deviation and inter-quartile range of all the variables of the processing unit are calculated, pre-processing the verified plurality of data to obtain pre-processed dataset of each of the one or more industrial processing units, wherein the pre-processing is an iterative process comprising the steps of outlier removal, imputation of missing values and clustering, integrating the pre-processed datasets of each of the one or more industrial processing units with one or more values of simulated variables of one or more physics-based models, and one or more domain inputs from user to obtain enterprise level dataset, wherein the unit-wise datasets are merged and synchronized taking into account the time lags due to residence times in various units, times of transportation of materials from one or more industrial processing units and response time of one or more sensors of the processing units, identifying one or more operating regimes using one or more clustering techniques on the enterprise level dataset, wherein one or more clustering techniques comprising of distance based clustering, density based clustering and hierarchical clustering, determining ranges of one or more variables corresponding to the KPIs of the enterprise level dataset based on predefined baseline statistics and the one or more operating regimes, wherein the determined ranges of one or more variables is being used to generate one or more plots of KPIs during the time period of analysis is being carried out, selecting one or more features of the enterprise level dataset to obtain a superset of one or more selected features of the enterprise level dataset, wherein the feature selection is performed on all the regime-wise datasets as well as the enterprise level dataset, developing one or more predictive models for each KPI, wherein the one or more predictive models using enterprise level dataset and the superset of one or more selected features of the enterprise level dataset and optimizing at least one KPI based on one or more predictive models and constraints on the one or more KPIs using one or more optimization techniques, wherein one or more optimization techniques includes gradient search, linear programming, goal programming, simulated annealing and evolutionary algorithms.

It should be appreciated by those skilled in the art that any block diagram herein represent conceptual views of illustrative systems embodying the principles of the present subject matter. Similarly, it will be appreciated that any flow charts, flow diagrams, state transition diagrams, pseudo code, and the like represent various processes which may be substantially represented in computer readable medium and so executed by a computing device or processor, whether or not such computing device or processor is explicitly shown.

BRIEF DESCRIPTION OF THE DRAWINGS

The embodiments herein will be better understood from the following detailed description with reference to the drawings, in which.

DETAILED DESCRIPTION OF EMBODIMENTS

The embodiments herein and the various features and advantageous details thereof are explained more fully with reference to the non-limiting embodiments that are illustrated in the accompanying drawings and detailed in the following description. The examples used herein are intended merely to facilitate an understanding of ways in which the embodiments herein may be practiced and to further enable those of skill in the art to practice the embodiments herein. Accordingly, the examples should not be construed as limiting the scope of the embodiments herein.

Figure 1:
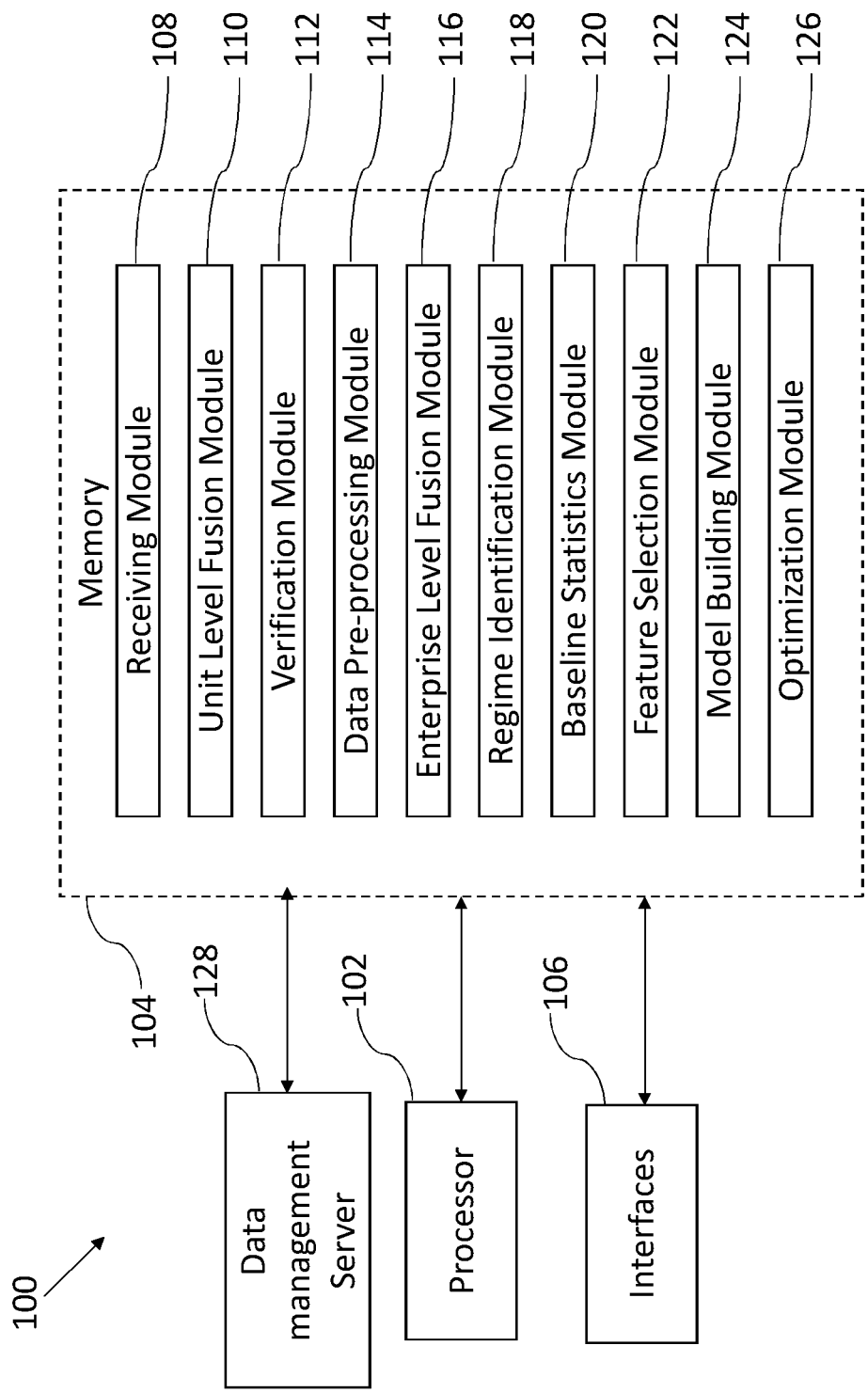
FIG. 1 illustrates a system for analyzing a plurality of data from one or more industrial processing units for optimizing the key performance indicators of the industry according to an embodiment of the present disclosure.

Referring FIG. 1, a system 100 for analyzing a plurality of data from one or more industrial processing units for optimizing the key performance indicators of the industry. The system 100 comprising a processor 102, a memory 104 communicatively coupled to the processor 102, a plurality of interfaces 106, a receiving module 108, a unit level fusion module 110, a verification module 112, a data pre-processing module 114, an enterprise level fusion module 116, a regime identification module 118, a baseline statistics module 120, a feature selection module 122, a model building module 124, an optimization module 126 and a data management server 128.

In the preferred embodiment, the memory 104 contains instructions that are readable by the processor 102. The plurality of interfaces 106 comprising of graphical user interface, server interface, a physics based model interface and a solver interface. The graphical user interface is used to receive inputs such as the KPIs of interest and the time period of analysis from the user and forward them to the plurality of modules. The server interface forwards the request-for-data received from the one of the plurality of modules to the data management server 128 and the data received from the data management server 128 to the plurality of modules. The physics based model interface sends the integrated dataset received from the one of the plurality of modules after enterprise level fusion to physics-based models, if any, available for the industrial process, receives the values of simulated variables from the physics-based models and forwards them to the one of the plurality of modules.

In the preferred embodiment, a receiving module 108 is configured to receive the plurality of data of one or more industrial processing units, wherein the plurality of data comprising of characteristics of raw materials, characteristics of intermediate products, by-products and end products, process parameters and condition of process equipment.

Figure 2:
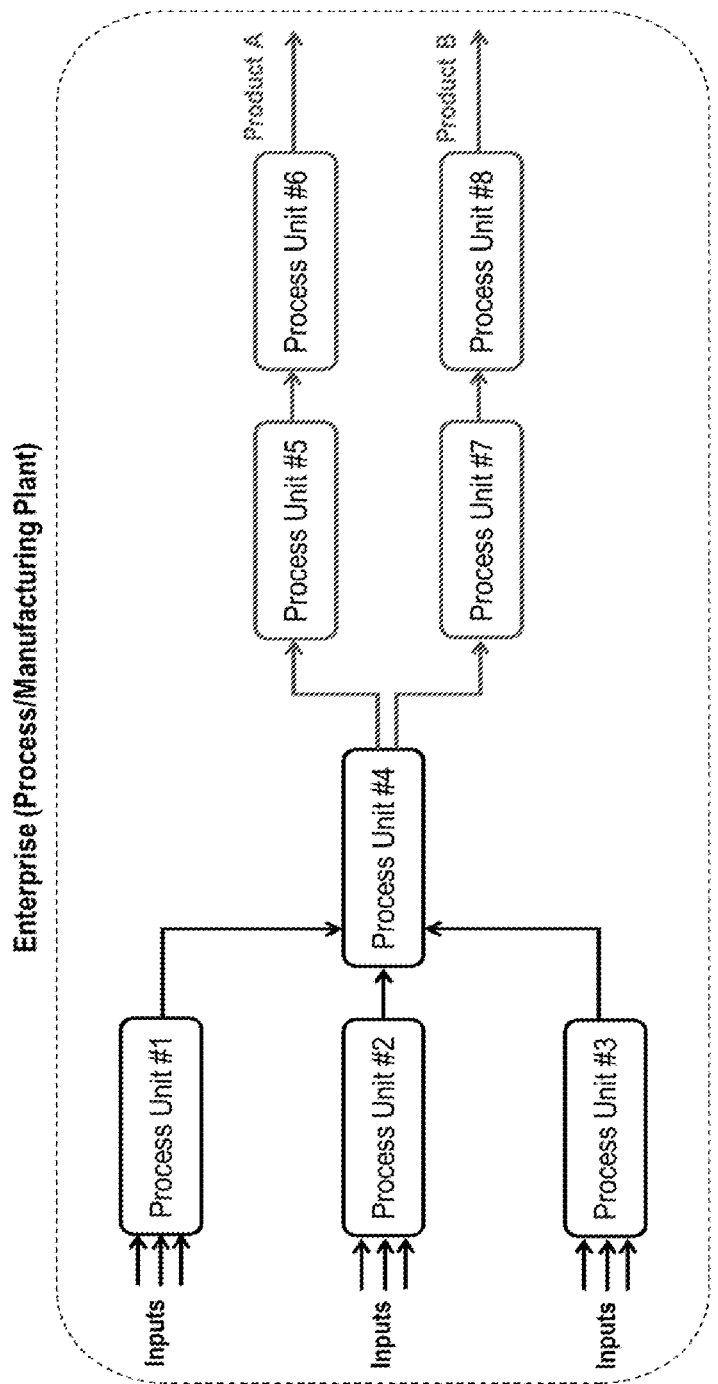
FIG. 2 is a schematic of a manufacturing or process plant according to an embodiment of the present disclosure.
Figure 3:
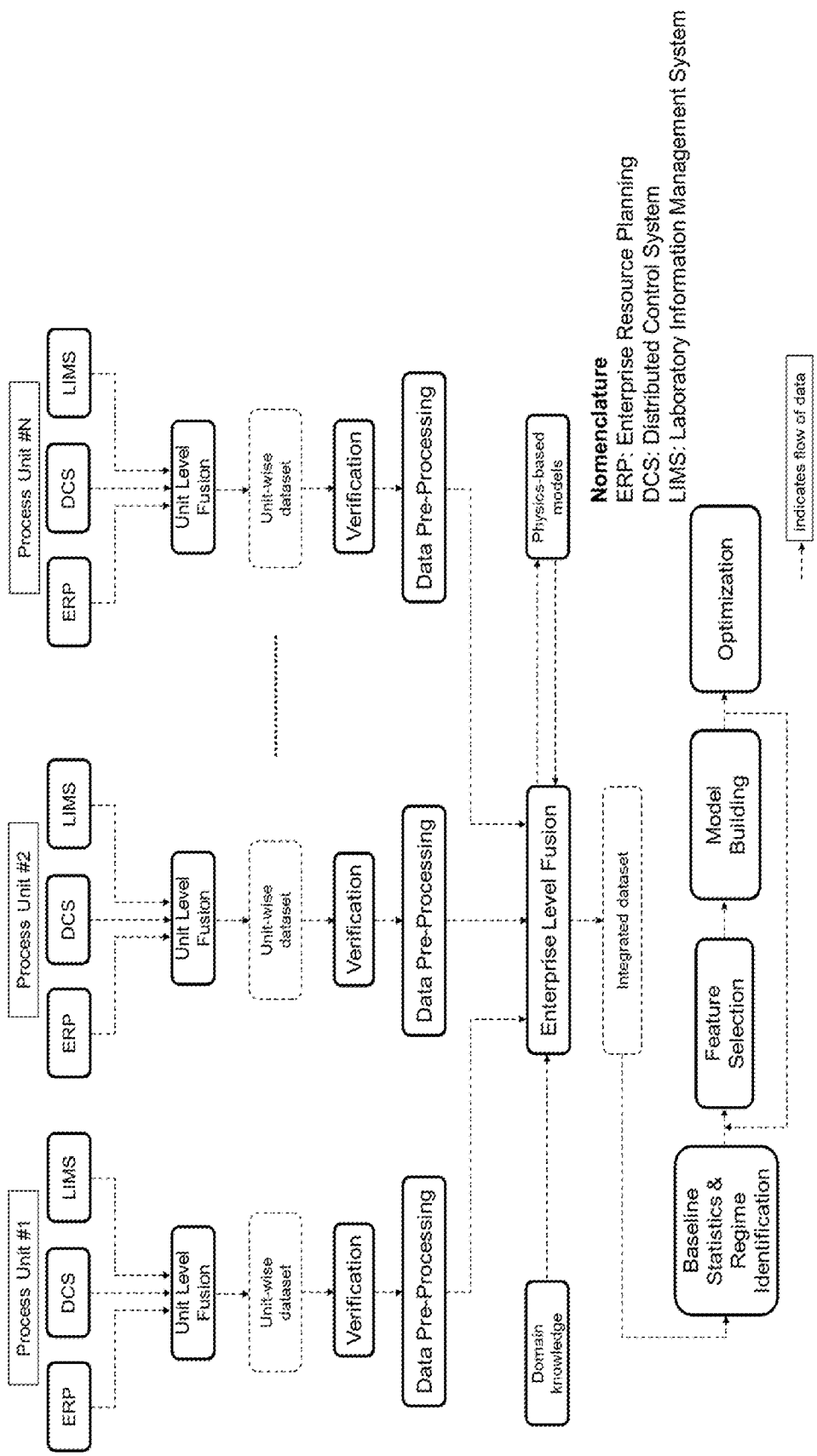
FIG. 3 is a schematic showing the steps in the method for optimization of KPIs according to an embodiment of the present disclosure.

Referring FIGS. 2 and 3, as examples, a schematic of a hypothetical industrial enterprise where most manufacturing and process enterprises consist of several units in series or parallel. The enterprise consists of 8 process units that produce two products viz. A & B. To produce product A, the flow of materials is through the following sequence of operations: (Unit #1, Unit #2, Unit #3)→Unit #4→Unit #5→Unit #6. Similarly, to produce product B, the flow of materials is through the following sequence of operations: (Unit #1, Unit #2, Unit #3)→Unit #4→Unit #7→Unit #8. In order to optimize KPIs related to the production of product A, say quality of product A or energy consumed per unit mass of product A produced, data from all the units involved in the operational sequence should be considered. Similarly, in order to optimize KPIs related to the production of product B, data from all the units involved in the operational sequence should be considered. Analysis of enterprise level data instead of unit level data can yield better insights into the operations of the enterprise. FIG. 3 shows that for each process unit of N process units, data is collected from various sources such as Enterprise Resource Planning (ERP), Distributed Control System (DCS) and Laboratory Information Management System (LIMS).

In the preferred embodiment, the unit level fusion module 110 is configured to merge the received plurality of data to obtain unit-wise dataset of each of the one or more industrial processing units, wherein the unit-wise dataset of each processing unit comprising of a desired sampling frequency. In the process of merging, the one or more variables from all the files or datasets are merged as per specific observation ID corresponding to the sampling frequency, e.g. date in case of daily data, hours in case of hourly data, etc. If the sampling frequency is inconsistent across various files/datasets, values of variables are averaged wherever possible. If averaging is not possible, the same data is used across, e.g. when hourly analysis is to be performed and only daily data is available, daily data value is used for all hours in that particular day. At the end of the process, unit-wise datasets with rows corresponding to the observation ID and columns corresponding to all the variables in the process unit are obtained.

In the preferred embodiment, the verification module 112 is configured to verify the merged unit-wise dataset of the one or more industrial processing units, wherein presence of absurd values, percentage availability, standard deviation and inter-quartile range of all the variables of the processing unit are calculated. Data quality verification is performed on the unit-wise datasets obtained for each of the process units. Missingness maps depicting the percentage and pattern of availability of the variables are also created for each process units. The data quality metrics and the missingness maps are sent as outputs to the user via the user interface. Depending on the availability of the data, the user can decide whether or not to proceed with the rest of the analysis. The user can also suggest deletion of some of the variables with very low availability before executing the rest of the steps.

Figure 4A:
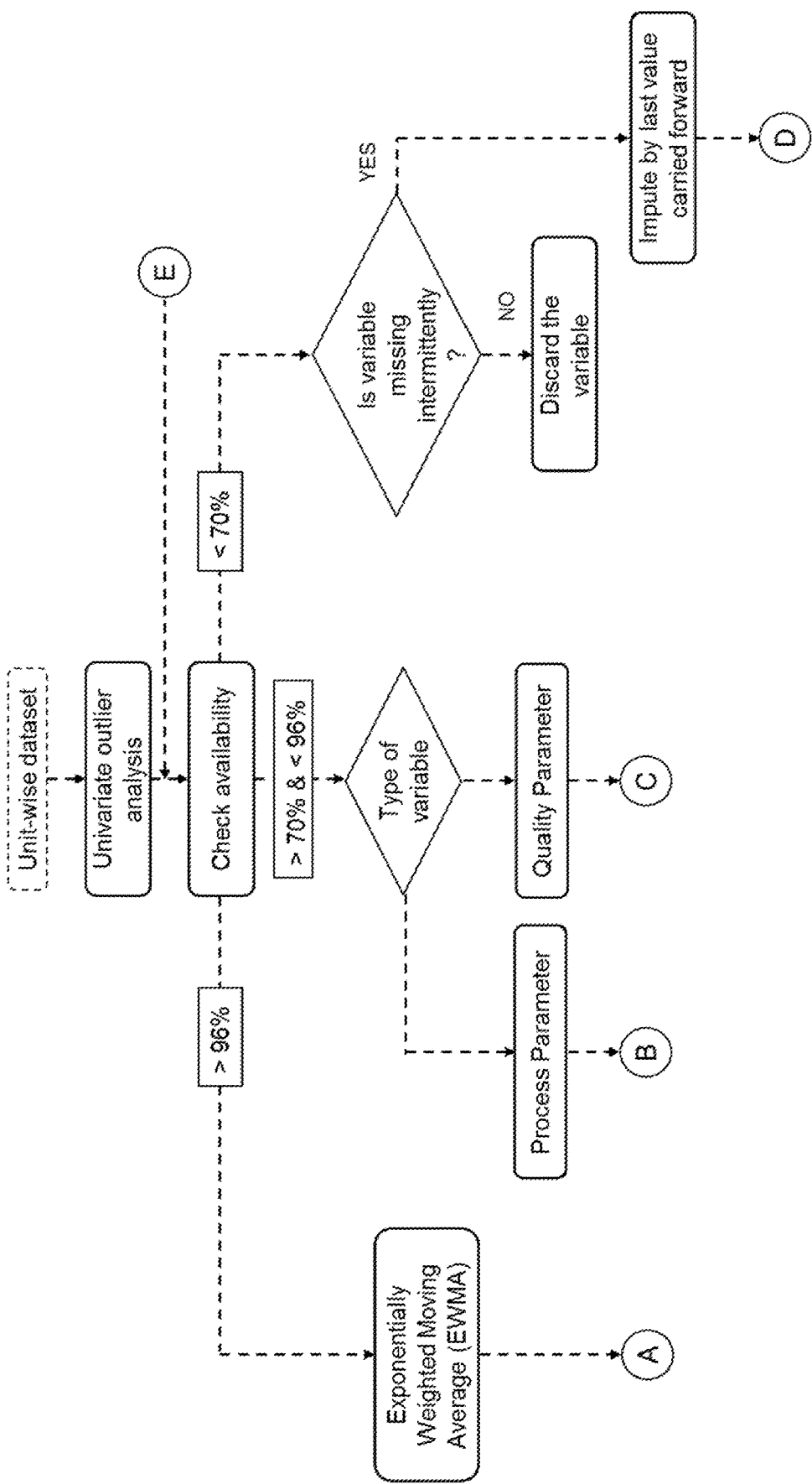
FIGS. 4(a) and 4(b) is a flow chart depicting data pre-processing using outlier and imputation techniques according to an embodiment of the present disclosure.
Figure 4B:
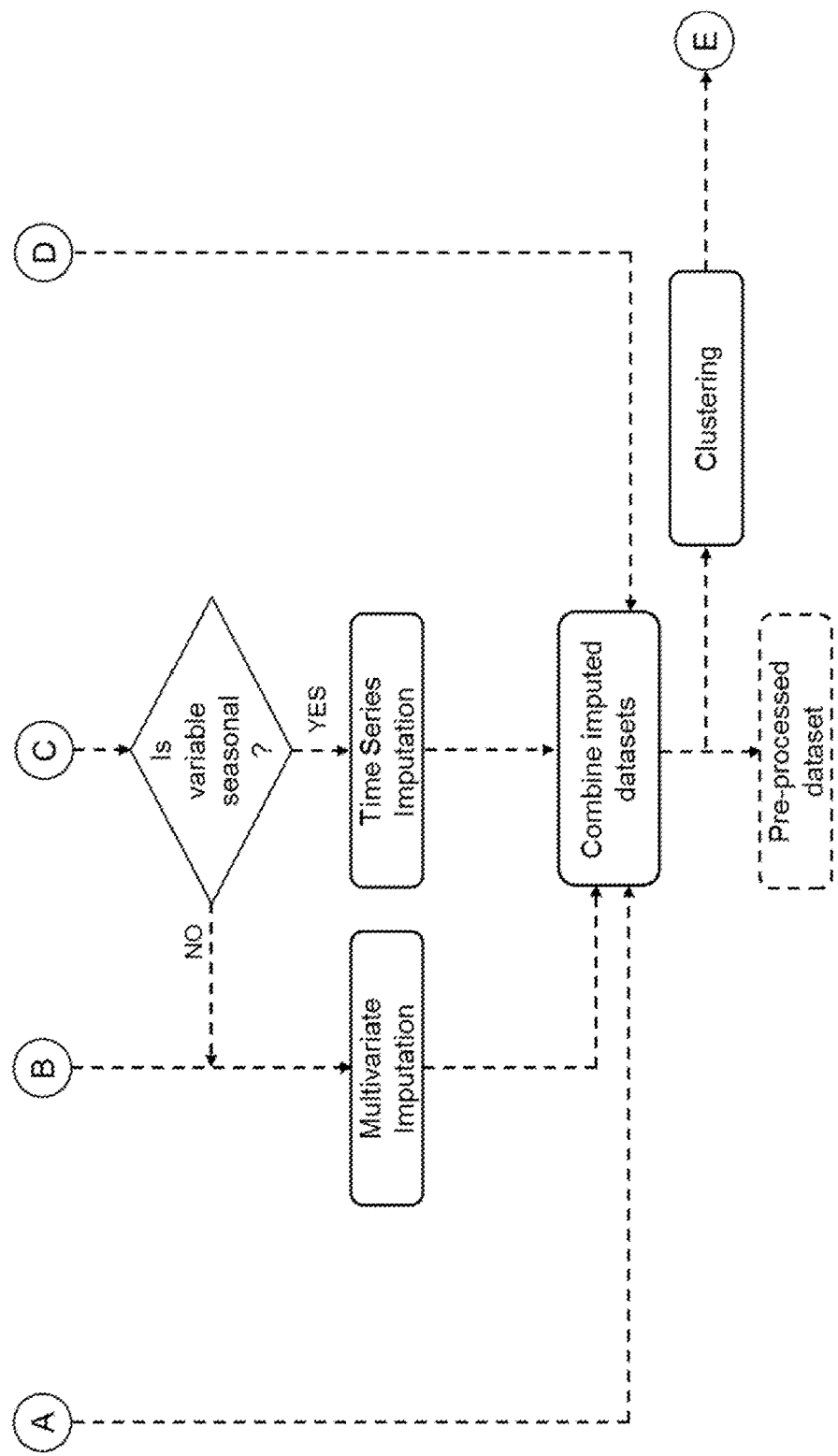
Figure 5:
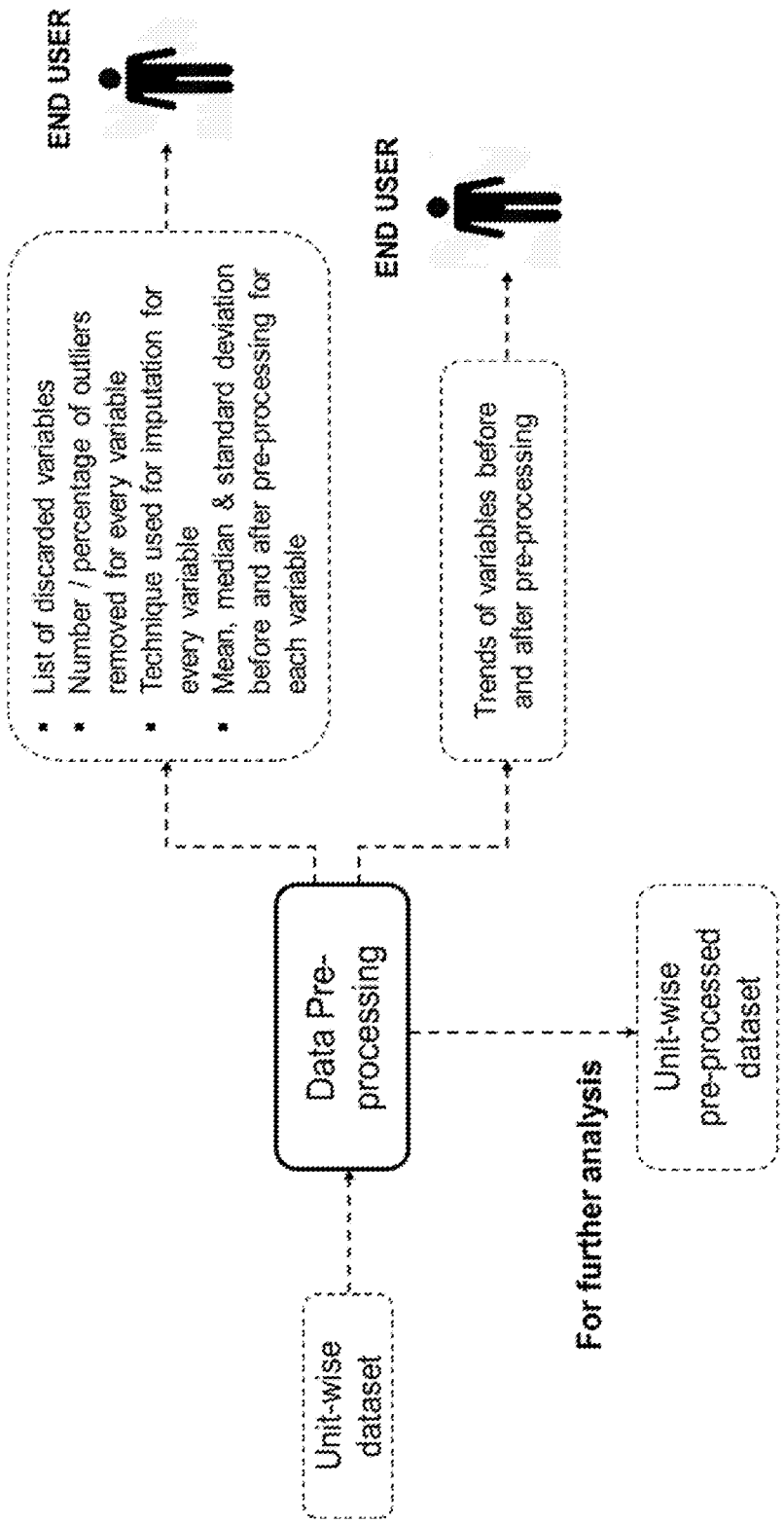
FIG. 5 is a schematic of inputs and outputs from the data pre-processing step according to an embodiment of the present disclosure.

Referring to FIGS. 4(a), 4(b) and 5, wherein the data pre-processing module 114 is configured to pre-process the verified plurality of data to obtain pre-processed dataset of each of the one or more industrial processing units, wherein the pre-processing is an iterative process comprising the steps of outlier removal, imputation of missing values and clustering. Variables with a percentage availability of at least seventy percent are considered for pre-processing, though this condition is relaxed for material variables such as raw materials, intermediate product and end-product characteristics as the missingness in these kinds of variables may be due to less number of samples as the laboratory analysis is generally carried out at periodic intervals only.

The material variables with availability less than desired availability and following no specific pattern in missingness are discarded from the dataset. A univariate outlier analysis is initially carried out to detect and remove outliers in the dataset, including inconsistent values arising due to instrument failure/malfunction. In case the production of a unit is zero, all variables for the unit for that time period are neglected. The variables are then categorized into various subsets based on the percentage availability of the variable. While multivariate imputation is used for process parameters and non-seasonal material characteristic variables, time series imputation is used for seasonal quality variables. After the missingness in all the variables is appropriately imputed, clustering is performed on the unit-wise dataset to identify clusters, if any, present in data. These clusters are representative of different regimes of operation. Each unit-wise dataset is then divided into different datasets based on the identified clusters. The divided datasets are taken through the steps of outlier removal and imputation as shown in FIGS. 4(a) and 4(b).

In the preferred embodiment, the iterative process of outlier removal, imputation and clustering is stopped when the number of clusters and the number of data points in each cluster do not change. Unit-wise pre-processed datasets are obtained at the end of this step. For each variable, the number/percentage of outliers removed, the technique used for imputation, and mean, median and standard deviation before and after pre-processing are presented to the user as outputs. List of discarded variables is also presented to the user. The user is also provided with the option of visualizing the trends of original and pre-processed variables.

Figure 6:
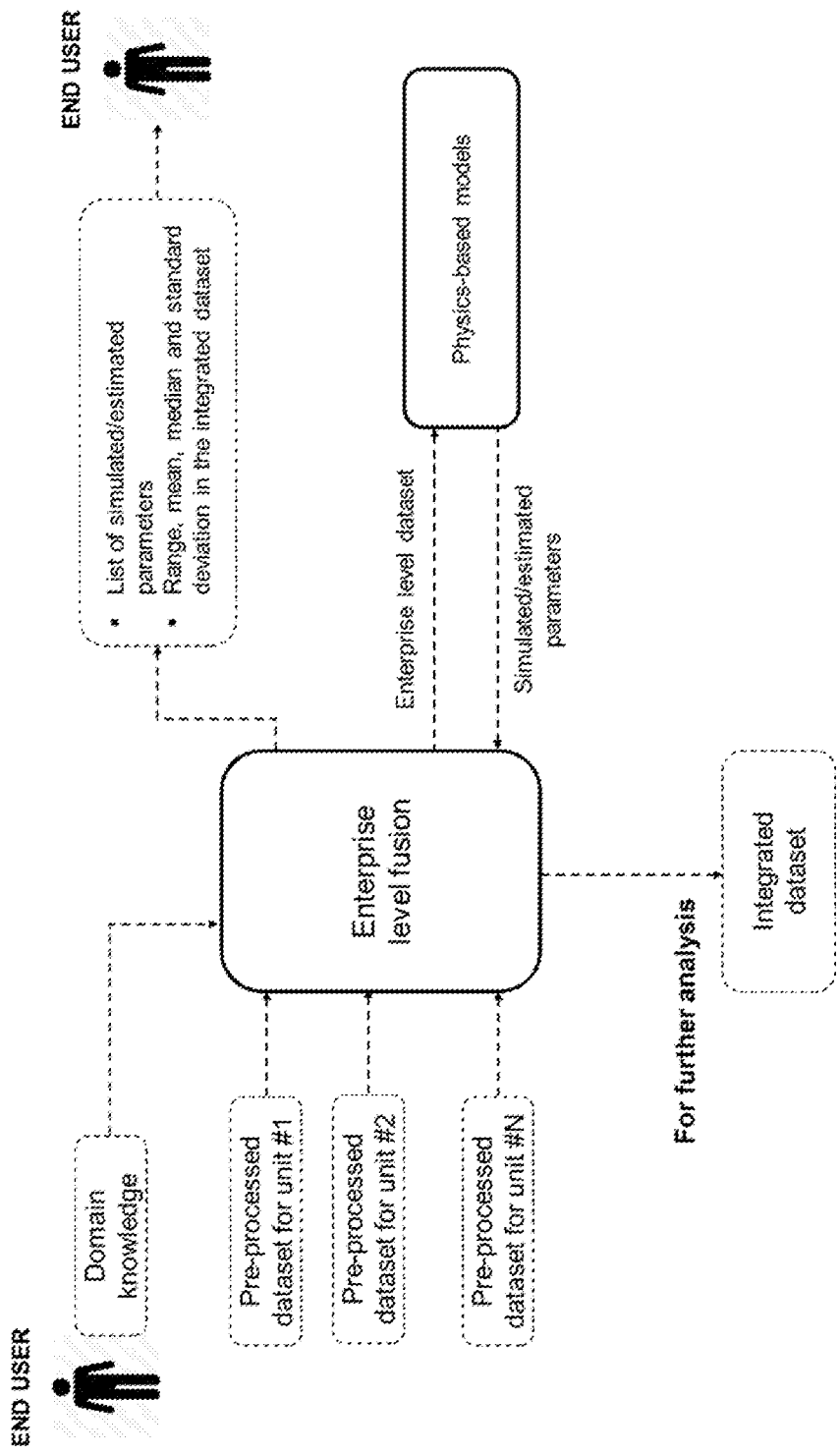
FIG. 6 is a schematic of inputs and outputs from the enterprise level integration according to an embodiment of the present disclosure.
Figure 7:
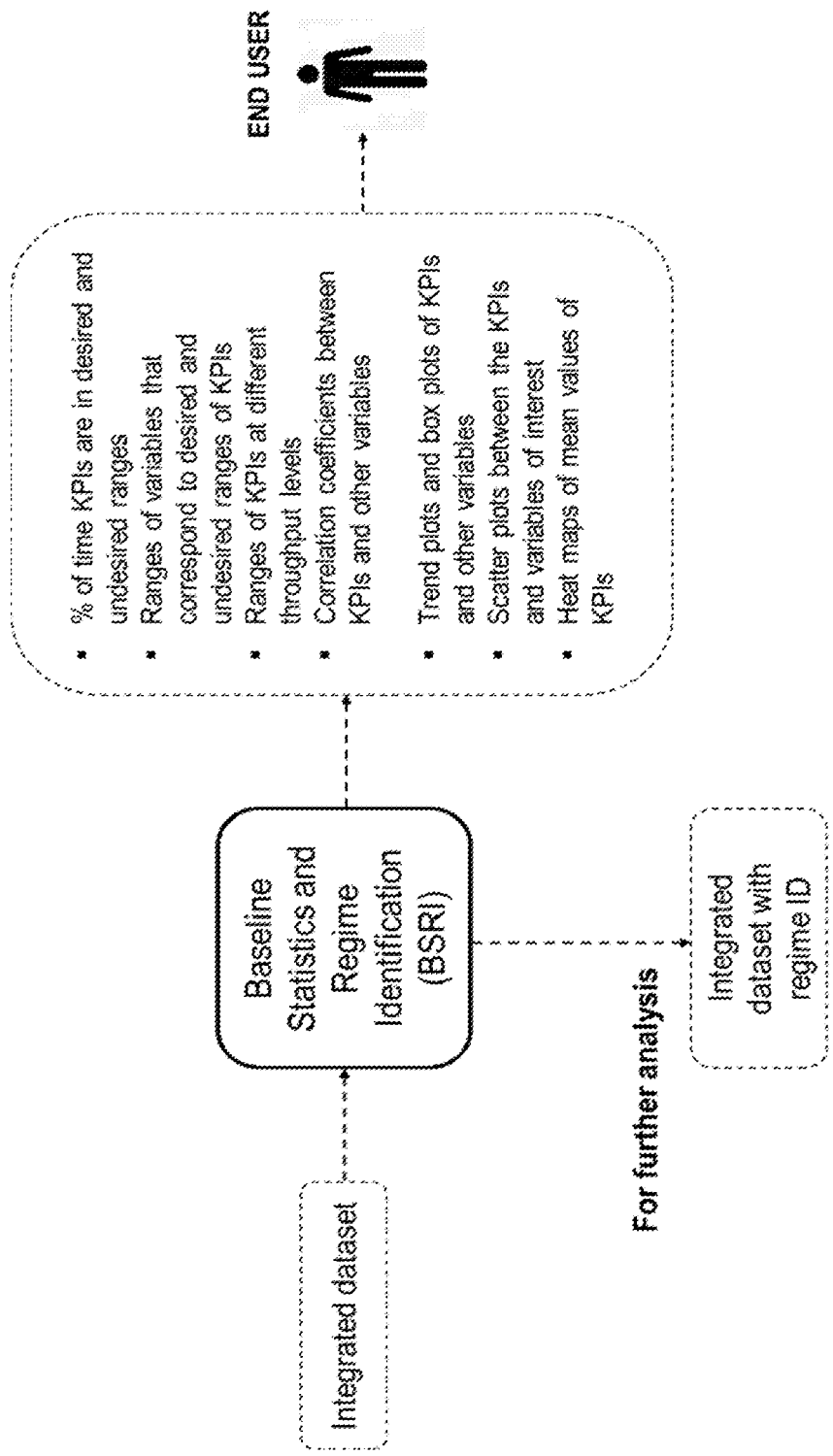
FIG. 7 is a schematic of inputs and outputs from the baseline statistics and regime identification according to an embodiment of the present disclosure.

In the preferred embodiment, referring FIG. 6, the enterprise level fusion module 116 is configured to integrate the pre-processed data of each of the one or more industrial processing units with one or more values of simulated variables of one or more physics based models and one or more domain inputs from user to obtain enterprise level dataset, wherein the unit-wise datasets are merged and synchronized taking into account the time lags due to residence times in various units, times of transportation between one or more industrial processing units and response time of one or more sensors of the processing units. If the transportation time between two process units is greater than the sampling frequency of data, then the observation IDs for one of the process units is shifted by appropriate number of time-units before integration. For example, if the sampling frequency is daily and it takes 2 days for material to travel from process unit A to process unit B, then all the observation IDs in the dataset of process A are shifted by 2 days before merging datasets from both the processes.

In the preferred embodiment, any particular process unit can be taken as the baseline for merging the data from all the process units. Typically the process unit from which the KPIs of interest are calculated is taken to be the baseline unit for data integration. In case the same intermediate product is coming out from two or more different process units, then operating variables from all such process units are considered for analysis. However, instead of using material characteristics (size analysis, chemical analysis, etc.) from all the process units where the intermediate product is generated, the weighted averaged characteristics are used. The weights could be the amounts of intermediate product generated from each of the process units or the amounts of intermediate product consumed in the subsequent process unit.

Once the enterprise level dataset is prepared, it is forwarded to physics-based models, if any, available for the industrial process via the physics-based model interface for calculation of simulated variables. These are parameters that may have an impact on the KPIs but cannot be directly measured in the process. Examples of simulated variables are temperature in the high temperature (>1500° C.) zone of a furnace, concentration of intermediate product in a reactor, etc. The simulated parameters are sent back to the enterprise level fusion module and are added to the enterprise level dataset to obtain the integrated dataset for further analysis. Outputs from the enterprise level integration include range, mean, median and standard deviation of all variables, and the list of simulated and estimated parameters.

In the preferred embodiment, the regime identification module 118 is configured to identify one or more operating regimes using one or more clustering techniques on the enterprise level dataset, wherein one or more clustering techniques comprising of distance based clustering, density based clustering and hierarchical clustering.

In the preferred embodiment, the baseline statistics module 120 is configured to determine ranges of one or more variables of the KPIs of the enterprise level dataset, based on predefined baseline statistics and the one or more operating regimes, wherein the ranges of one or more variables is being used to generate one or more plots of KPIs during the time period of analysis is being carried out. Baseline statistics such as the percentage of time the KPIs are in the desired and undesired ranges, the ranges of variables that correspond to desired and undesired ranges of KPIs, the ranges of KPIs at different throughput levels, and the correlation coefficients between the KPIs and other variables in the integrated dataset are calculated and notified to the user. The user is given the option to generate trend plots and box plots of the KPIs and all variables in the integrated dataset during the time period for which the analysis is being carried out. The user can also generate scatter plots between the KPIs and variables of interest. All the variables in the integrated dataset are binned into several intervals between their minimum and maximum values. The values of the KPI corresponding to each bin of each variable are separated and their mean is calculated. The mean values of the KPI corresponding to the bins/intervals of all the variables are depicted in the form of a heat map and notified to the user.

In the preferred embodiment, the feature selection module 122 is configured to select one or more features of the enterprise level dataset to obtain a superset of one or more selected features of the enterprise level dataset, wherein the feature selection is performed on all the regime-wise datasets as well as the enterprise level dataset. The integrated dataset is divided into two or more datasets depending on the number of regimes identified during the regime identification step.

Figure 8:
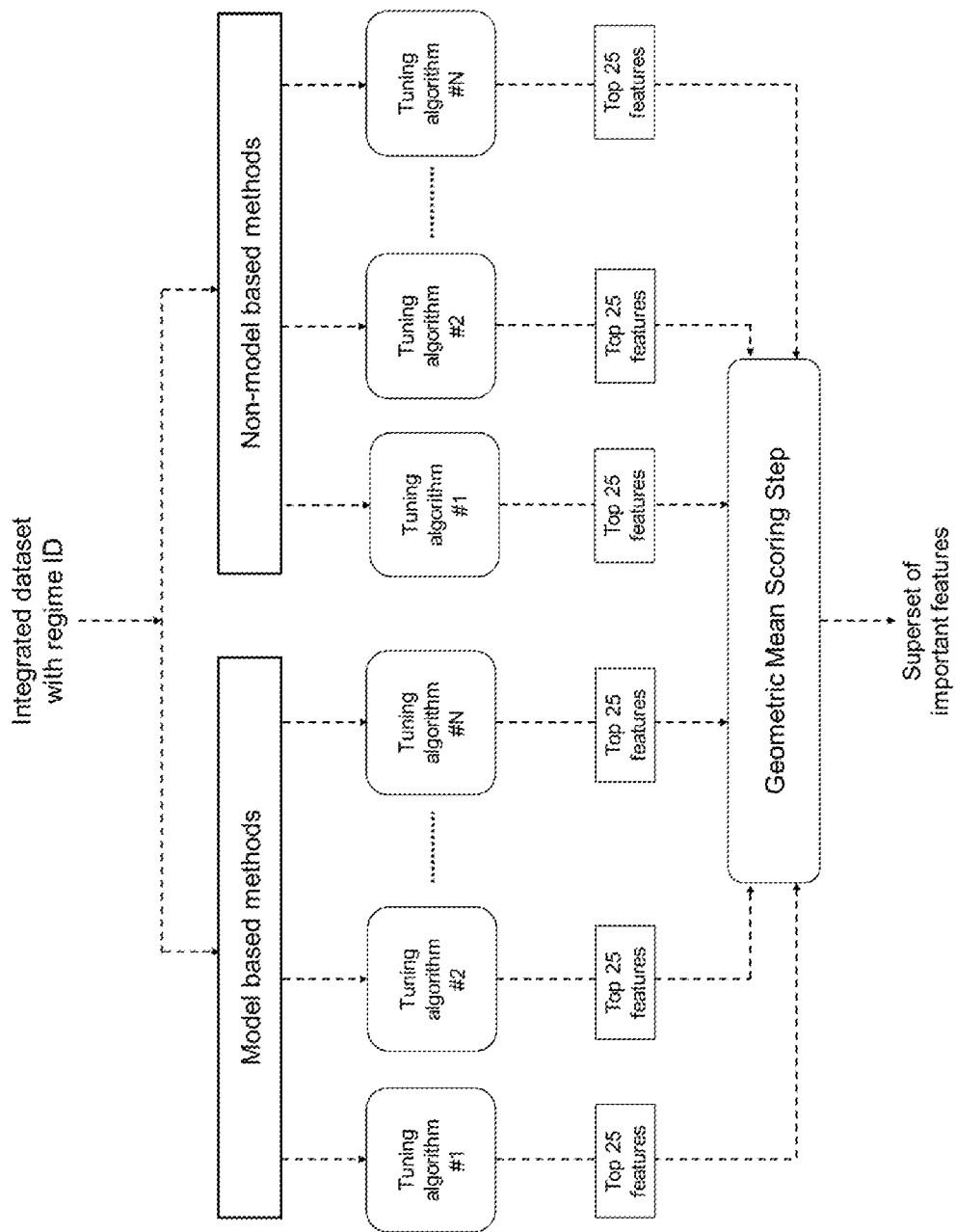
FIG. 8 is a flow chart of feature selection according to an embodiment of the present disclosure.

It would be appreciated that a two-stage feature selection approach as shown in FIG. 8 is used to select the important features. In the first stage, important features are obtained from various feature selection methods. This stage involves tuning of parameters available in the feature selection algorithms and k-fold cross validation to obtain important features. The feature selection methods could be model-based methods such as random forest, multivariate adaptive regression splines, supervised principal component analysis, stepwise regression and support vector regression, or non-model-based methods such as association mining and time series clustering. In the second stage, the lists of important features obtained from individual feature selection techniques are combined to obtain a single 'superset' of important features. This is obtained by scoring the top 25 features identified by all the techniques using the geometric mean scoring method. The score for feature 1' is calculated as follows:

$$Score_i = \left( \prod_k R_{i,k} \right)^{1/n_i}$$

$n_i$ a is the frequency or number of methods which selected $i^{th}$ feature; and
$R_{i,k}$ is the rank of feature i in the $k^{th}$ method.

The superset of important features along with their importance score with respect to the KPIs for the regime-wise datasets and the integrated dataset are notified to the user. The user is given the option to add additional features or delete existing features from the supersets. For each dataset, parallel coordinate plots are also displayed to the user.

Figure 9A:
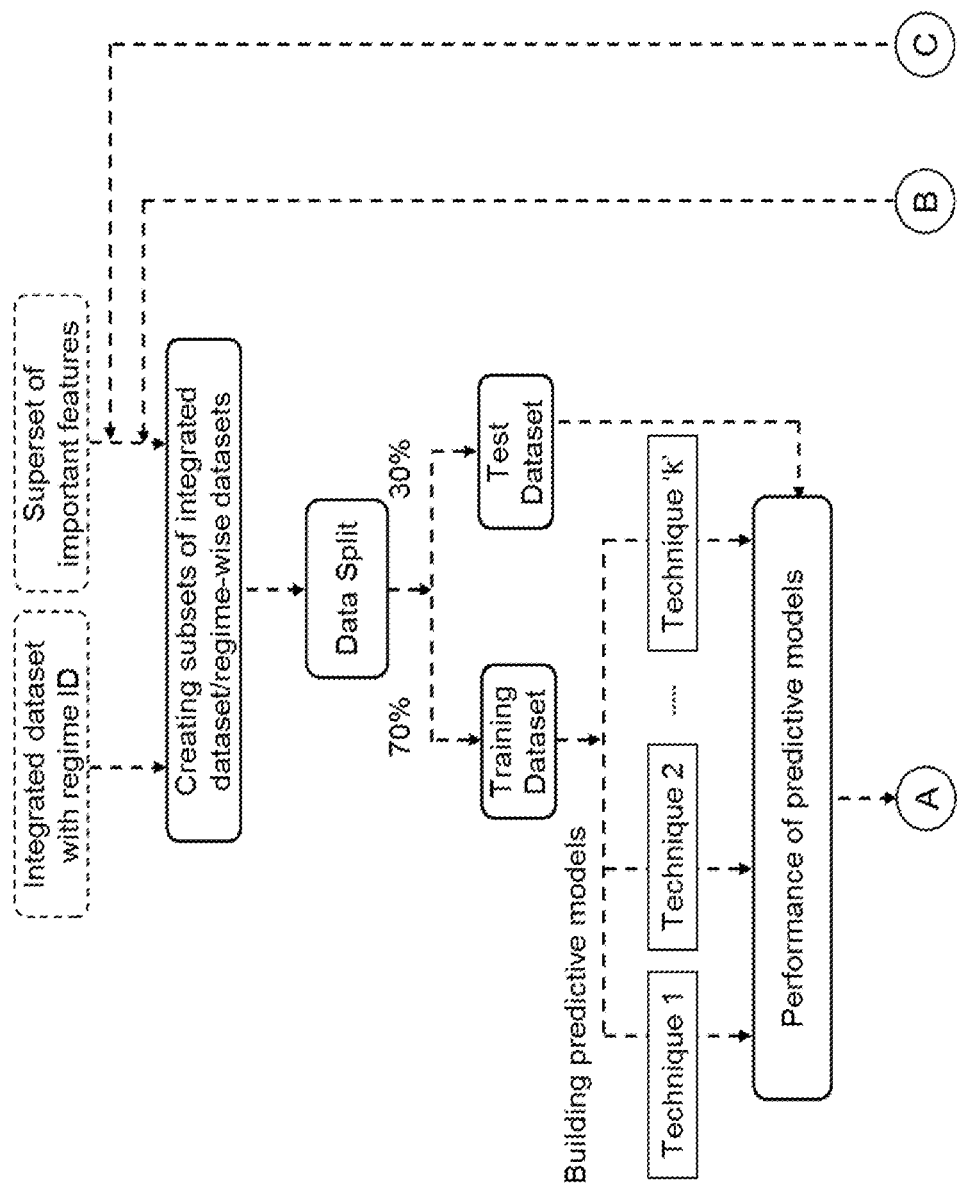
FIGS. 9(a) and 9(b) is a flow chart of the model building and discrimination according to an embodiment of the present disclosure.
Figure 9B:
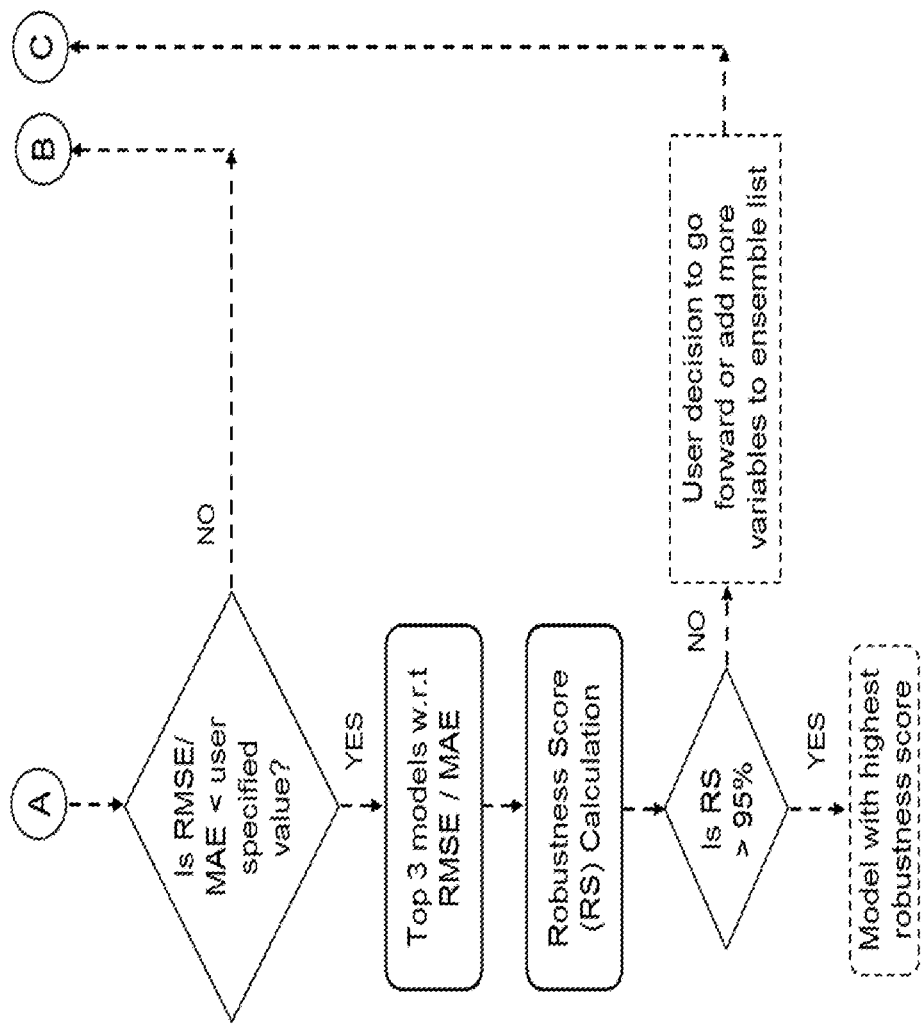
Figure 10:
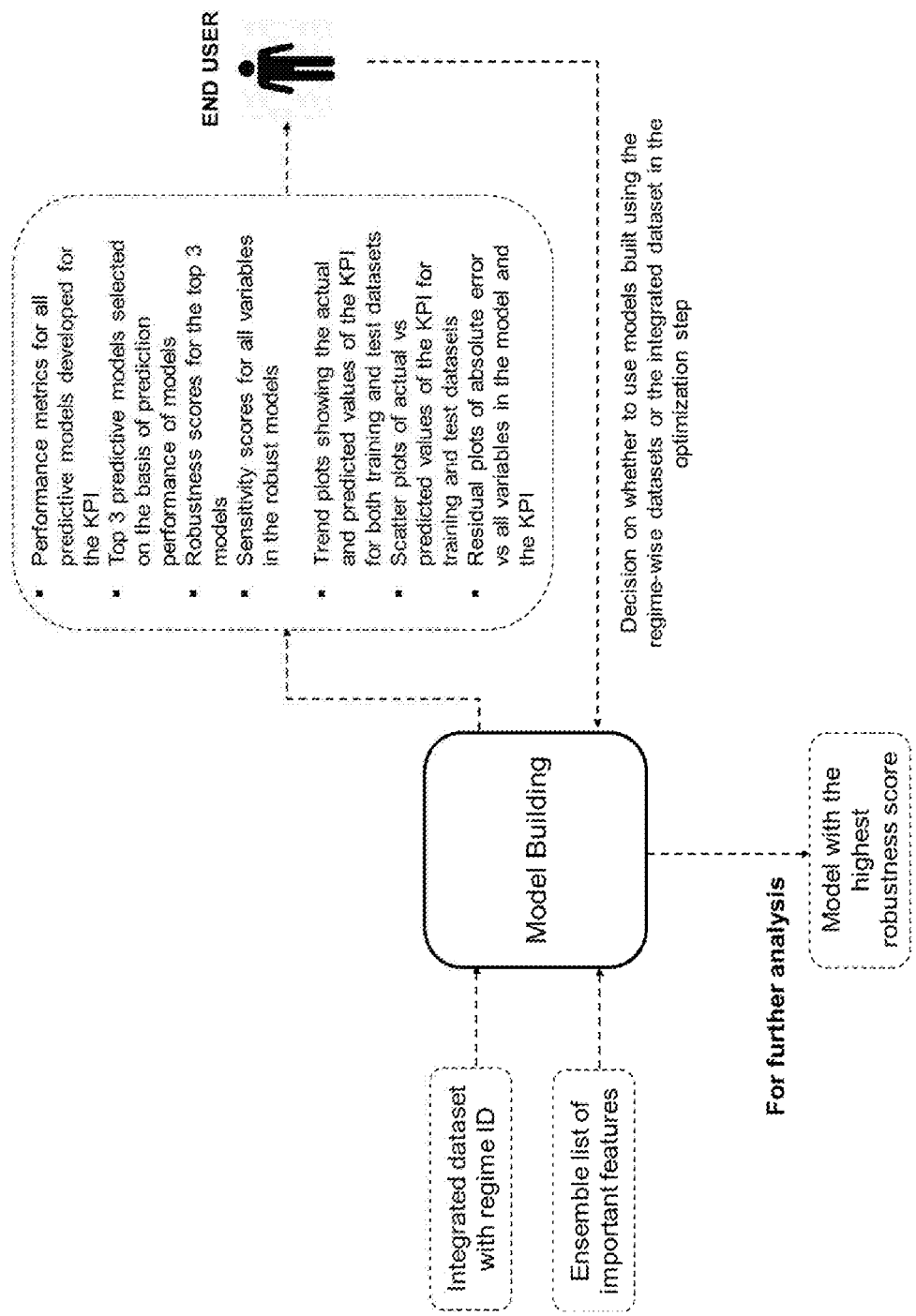
FIG. 10 is a schematic of inputs and outputs from the model building and discrimination according to an embodiment of the present disclosure.

Referring FIGS. 9(a) and 9(b), the model building module 124 of the system 100 is configured to develop one or more predictive models for each KPI on the training dataset, wherein the one or more predictive models using enterprise level dataset and the superset of one or more selected features of the enterprise level dataset. It would be appreciated that a three-step model building approach is used. The first step involves building predictive models using basic model building algorithms. The one or more predictive models include stepwise regression, principal component regression, multivariate adaptive regression splines, independent component regression, lasso regression, kriging, random forest, partial least squares, gradient boosted trees, generalized linear modeling, linear and nonlinear support vector machines and artificial neural networks. The second step involves tuning the model building parameters in order to optimize the prediction performance of the models. The prediction performance of the models is evaluated using the test dataset and is expressed in terms of root mean square error (RMSE) of prediction, mean absolute error (MAE) of prediction, akaike information criterion (AIC), corrected akaike information criterion (AICc) and the Bayesian information criterion (BIC) and hit rate (% of points with a given predictive accuracy) as shown in FIG. 10. It would be appreciated that if in any case none of the predictive models meet the RMSE and/or MAE, the user is given the option to go back to the feature selection where additional variables or transformed variables can be added to the superset of important variables and repeat the model building step.

The third step involves model discrimination and selection in which for the integrated dataset and the regime-wise datasets, the top three predictive models with values of root mean square error and mean absolute error lower than user specified values are chosen. A robustness score (RS) is evaluated for the top three models and used for model discrimination. At least ten thousand data points containing values of all variables included in the models are randomly generated and used to predict the KPI. The robustness score for each model is then determined using, $$RS = \frac{\text{Number of data points for which } KPI \text{ is within a desired range}}{\text{Total number of data points for which } KPI \text{ is predicted}}$$

The predictive models with the highest robustness score greater than 95% is selected for sensitivity analysis and optimization. Variance based sensitivity analysis is performed to assess the sensitivity of the KPI to unit changes in the variables in the model. Sensitivity scores for each of the variables in the models are obtained, with a higher score indicating a higher change in the value of the KPI with unit change in the value of the variable. It would be appreciated that if the robustness score for all of the three predictive models is lower than 95%, the user can modify the superset of important features and repeat the model building step.

It would be appreciated that the predictive performance of the models is likely to decrease with time as newer/future data is used for prediction and a 'self-learning' option is provided to the user to improve the accuracy of the predictive models. For self-learning, original data used for developing the models and data for the newer time period are combined, and the model building step is repeated on the combined dataset. Self-learning can be triggered either automatically on a periodic basis (e.g. every week or every month) or by the user based on statistical measures related to the models or the newer dataset. Statistical measures related to the models could be model performance metrics such as root mean square error, mean absolute error, akaike information criterion, corrected akaike information criterion, Bayesian information criterion or hit rate while statistical measures related to the newer dataset could be mean percentage deviation of newer data from the original data or multivariate distance between original dataset and newer dataset.

In the preferred embodiment, the optimization module is configured to optimize at least one KPI based on one or more predictive models and constraints on the one or more KPIs using one or more optimization techniques, wherein one or more optimization techniques includes gradient search, linear programming, simulated annealing and evolutionary algorithms.

Figure 11:
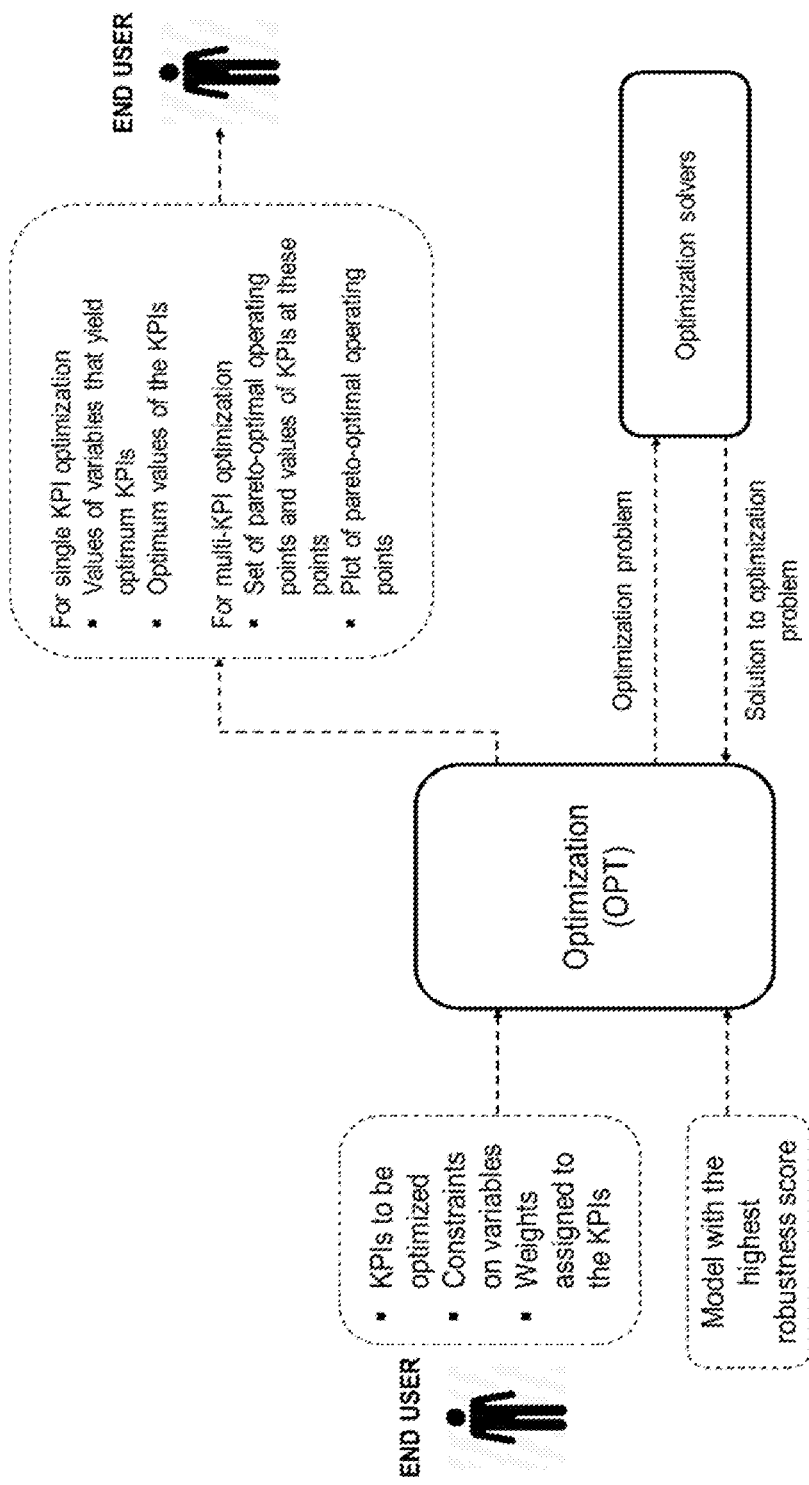
FIG. 11 is a schematic of inputs and outputs from the optimization according to an embodiment of the present disclosure.

Referring FIG. 11, a schematic diagram of the optimization where the KPIs to be optimized with constraints on the variables used in the predictive models are taken as inputs from the user and the values of variables that yield optimum levels of the KPIs are determined. When any one of the KPIs needs to be optimized, the problem is to minimize or maximize the KPI and the solution consists of values of variables that lead to the minimum/maximum KPI. When two or more KPIs need to be optimized simultaneously, the problem is to minimize the cost function (e.g. Cost function=0.6 $KPI_1$+0.4 $KPI_2$-1.2 $KPI_3$) and the solution consists of a set of pareto-optimal operating points for the process. The cost function for multi-KPI optimization is constructed using the weights assigned to each of the KPIs by the user. Several optimization techniques such as gradient search, linear programming, goal programming, simulated annealing and evolutionary algorithms like genetic algorithms are used. The optimization problem is forwarded to optimization solvers for single or multi-objective optimization algorithms such as rule-based, fuzzy logic-based, and gradient-based solvers via the solver interface. The solutions received from the solvers are processed and notified to the user. User outputs from the optimization step include the values of variables that yield optimum KPIs and the optimum values of the KPIs, set of pareto-optimal operating points and the values of the KPIs at these points, and the plot of pareto-optimal operating points.

Figure 12A:
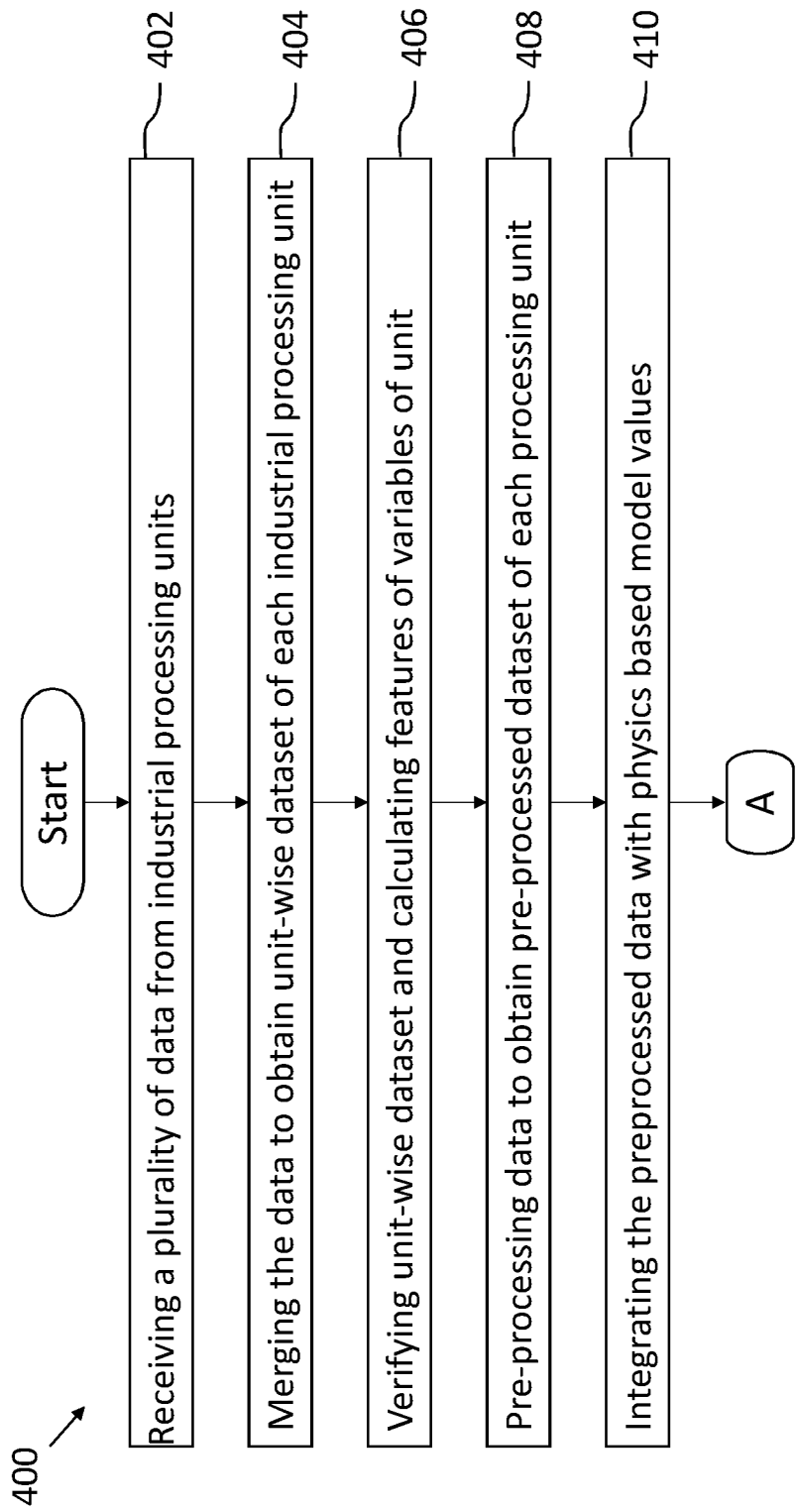
FIGS. 12 (a) and 12(b) illustrates a method for analyzing a plurality of data from one or more industrial processing units for optimizing the key performance indicators of the industry according to an embodiment of the present disclosure.
Figure 12B:
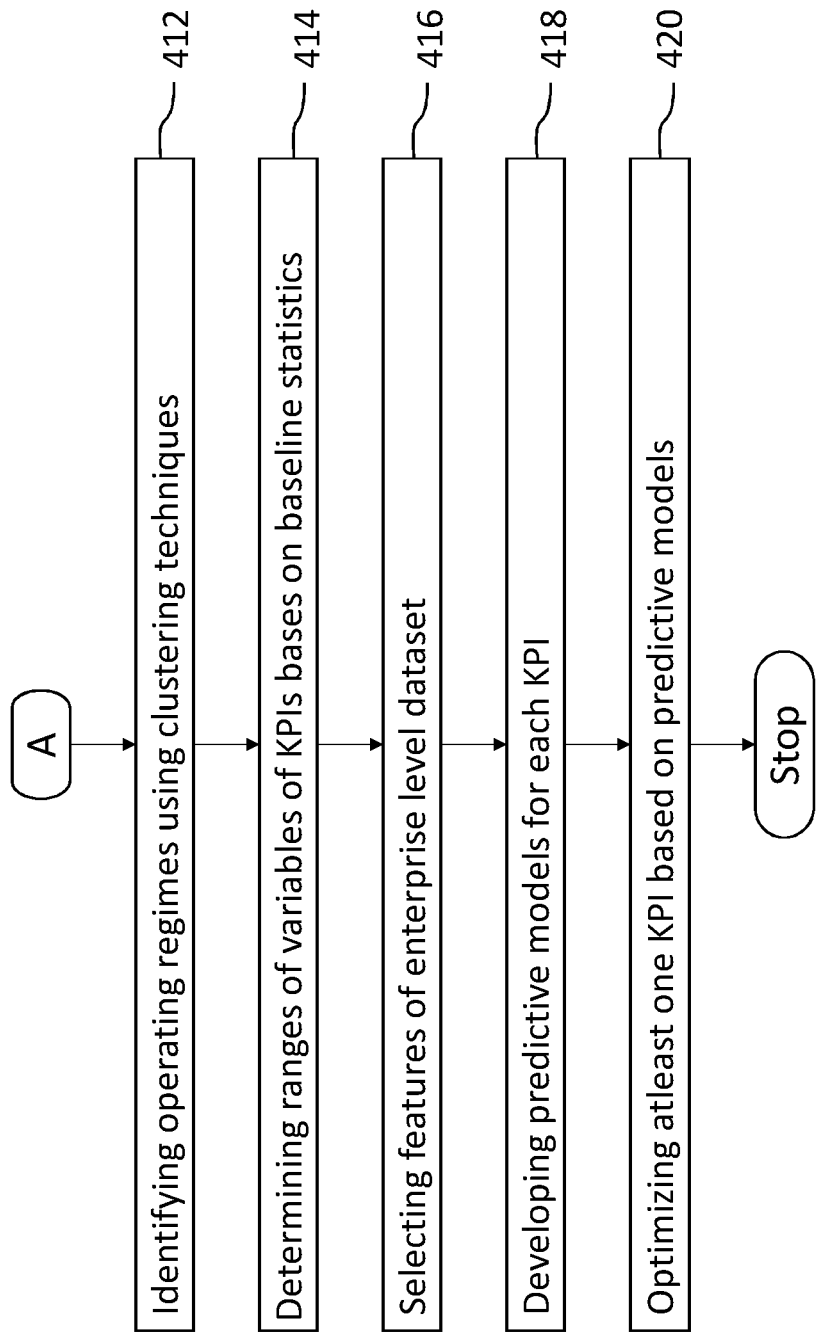

Referring FIGS. 12(a) and 12(b), a method 400 to analyze a plurality of data from one or more industrial processing units for optimizing the key performance indicators (KPIs) of the industry.

At the step 402, where the receiving module receives the plurality of data of one or more industrial processing units, wherein the plurality of data comprising of characteristics of raw materials, characteristics of intermediate products, by-products and end products, process parameters, environment, market demand, availability of raw materials and condition of process equipment.

At the step 404, where the unit level fusion module merges the received plurality of data to obtain unit-wise dataset of each of the one or more industrial processing units, wherein the unit-wise dataset of each processing unit comprising of a desired sampling frequency.

At the step 406, where the verification module verifies the merged unit-wise dataset of the one or more industrial processing units, wherein presence of absurd values, percentage availability, standard deviation and inter-quartile range of all the variables of the processing unit are calculated.

At the step 408, where the data pre-processing module pre-processes the verified plurality of data to obtain pre-processed dataset of each of the one or more industrial processing units, wherein the pre-processing is an iterative process comprising the steps of outlier removal, imputation of missing values and clustering. The outputs to the user from the data pre-processing module include list of discarded variables, number and percentage of outliers removed for every variable, technique used for imputing missing values in every variable, mean, median and standard deviation of every variable before and after pre-processing, and trend plots of all variables before and after pre-processing.

At the step 410, where the enterprise level fusion module integrates the pre-processed data of each of the one or more industrial processing units with one or more values of simulated variables of one or more physics based models and one or more domain inputs from user to obtain enterprise level dataset, wherein the unit-wise datasets are merged and synchronized taking into account the time lags due to residence times in various units, times of transportation between one or more industrial processing units and response time of one or more sensors of the processing units. The outputs to the user from the enterprise level fusion module include list of simulated parameters, and the range, mean, median and standard deviation of all variables in the integrated dataset.

At the step 412, the regime identification module identifies one or more operating regimes using one or more clustering techniques on the enterprise level dataset, wherein one or more clustering techniques comprising of distance based clustering, density based clustering and hierarchical clustering.

At the step 414, the baseline statistics module determines ranges of one or more variables corresponding to the KPIs of the enterprise level dataset, based on predefined baseline statistics and the one or more operating regimes, wherein the determined ranges of one or more variables is being used to generate one or more plots of KPIs during the time period of analysis is being carried out. The outputs to the user from the baseline statistics module include the percentages of time period KPIs are in the desired and undesired ranges, the ranges of variables that correspond to desired and undesired ranges of KPIs, the ranges of KPIs at different productivity levels, correlation coefficients between KPIs and other variables, trend plots and box plots of KPIs and other variables, scatter plots between KPIs and variables of interest, and heat maps of mean values of the KPIs.

At the step 416, the feature selection module selects one or more features of the enterprise level dataset to obtain a superset of one or more selected features of the enterprise level dataset, wherein the feature selection is performed on all the regime-wise datasets as well as the enterprise level dataset. The outputs to the user from the feature selection module include the superset of features and their importance scores for regime-wise and integrated datasets, and parallel coordinate plots of the features.

At the step 418, the model building module develops one or more predictive models for each KPI, wherein the one or more predictive models using enterprise level dataset and the superset of one or more selected features of the enterprise level dataset. The outputs to the user from the model building and discrimination module include performance metrics for all predictive models, top three predictive models developed on the basis of RMSE and MAE, robustness scores for the top three models, sensitivity scores for all variables in the robust models. In addition to, the outputs to the user from the model building and discrimination module also include trend plots of the actual and predicted values of the KPI, scatter plots of actual vs predicted values of the KPI and residual plots of absolute error vs all variables in the robust models.

At final step 420, the optimization module optimizes at least one KPI based on one or more predictive models and constraints on the one or more KPIs using one or more optimization techniques, wherein one or more optimization techniques includes gradient search, linear programming, simulated annealing and evolutionary algorithms. The outputs to the user from the optimization module include the values of variables that yield optimum KPIs (pareto-optimal operating points), optimum values of the KPIs and plots of pareto-optimal operating points.

The written description describes the subject matter herein to enable any person skilled in the art to make and use the embodiments. The scope of the subject matter embodiments is defined by the claims and may include other modifications that occur to those skilled in the art. Such other modifications are intended to be within the scope of the claims if they have similar elements that do not differ from the literal language of the claims or if they include equivalent elements with insubstantial differences from the literal language of the claims.

A system and method for performing data-based optimization of performance indicators of process and manufacturing plants. The system consists of modules for collecting and merging data from industrial processing units, pre-processing the data to remove outliers and missingness. Further, the system generates customized outputs from data and identifies important variables that affect a given process performance indicator. The system also builds predictive models for key performance indicators comprising the important features and determines operating points for optimizing the key performance indicators with minimum user intervention. In particular, the system receives inputs from users on the key performance indicators to be optimized and notifies the users of outputs from various steps in the analysis that help the users to effectively manage the analysis and take appropriate operational decisions.

The embodiments of present disclosure herein addresses unresolved problem of optimization of performance indicators to monitor the performance of manufacturing industries and process plants, in addition to, the pre-processing of the received industrial data from variety of sources having different formats and recording frequencies.

It is, however to be understood that the scope of the protection is extended to such a program and in addition to a computer-readable means having a message therein; such computer-readable storage means contain program-code means for implementation of one or more steps of the method, when the program runs on a server or mobile device or any suitable programmable device. The hardware device can be any kind of device which can be programmed including e.g. any kind of computer like a server or a personal computer, or the like, or any combination thereof. The device may also include means which could be e.g. hardware means like e.g. an application-specific integrated circuit (ASIC), a field-programmable gate array (FPGA), or a combination of hardware and software means, e.g. an ASIC and an FPGA, or at least one microprocessor and at least one memory with software modules located therein. Thus, the means can include both hardware means and software means. The method embodiments described herein could be implemented in hardware and software. The device may also include software means. Alternatively, the embodiments may be implemented on different hardware devices, e.g. using a plurality of central processing units (CPUs).

The embodiments herein can comprise hardware and software elements. The embodiments that are implemented in software include but are not limited to, firmware, resident software, microcode, etc. The functions performed by various modules described herein may be implemented in other modules or combinations of other modules. For the purposes of this description, a computer-usable or computer readable medium can be any apparatus that can comprise, store, communicate, propagate, or transport the program for use by or in connection with the instruction execution system, apparatus, or device.

The medium can be an electronic, magnetic, optical, electromagnetic, infrared, or semiconductor system (or apparatus or device) or a propagation medium. Examples of a computer-readable medium include a semiconductor or solid state memory, magnetic tape, a removable computer diskette, a random access memory (RAM), a read-only memory (ROM), a rigid magnetic disk and an optical disk. Current examples of optical disks include compact disk-read only memory (CD-ROM), compact disk-read/write (CD-R/W) and Digital Video Disc (DVD).

A data processing system suitable for storing and/or executing program code will include at least one processor coupled directly or indirectly to memory elements through a system bus. The memory elements can include local memory employed during actual execution of the program code, bulk storage, and cache memories which provide temporary storage of at least some program code in order to reduce the number of times code must be retrieved from bulk storage during execution.

Input/output (I/O) devices (including but not limited to keyboards, displays, pointing devices, etc.) can be coupled to the system either directly or through intervening I/O controllers. Network adapters may also be coupled to the system to enable the data processing system to become coupled to other data processing systems or remote printers or storage devices through intervening private or public networks. Modems, cable modem and Ethernet cards are just a few of the currently available types of network adapters.

A representative hardware environment for practicing the embodiments may include a hardware configuration of an information handling/computer system in accordance with the embodiments herein. The system herein comprises at least one processor or central processing unit (CPU). The CPUs are interconnected via system bus to various devices such as a random access memory (RAM), read-only memory (ROM), and an input/output (I/O) adapter. The I/O adapter can connect to peripheral devices, such as disk units and tape drives, or other program storage devices that are readable by the system. The system can read the inventive instructions on the program storage devices and follow these instructions to execute the methodology of the embodiments herein.

The system further includes a user interface adapter that connects a keyboard, mouse, speaker, microphone, and/or other user interface devices such as a touch screen device (not shown) to the bus to gather user input. Additionally, a communication adapter connects the bus to a data processing network, and a display adapter connects the bus to a display device which may be embodied as an output device such as a monitor, printer, or transmitter, for example.

The preceding description has been presented with reference to various embodiments. Persons having ordinary skill in the art and technology to which this application pertains will appreciate that alterations and changes in the described structures and methods of operation can be practiced without meaningfully departing from the principle, spirit and scope.

What is claimed is:

1. A computer implemented method to analyze a plurality of data from one or more industrial processing units for optimizing key performance indicators (KPIs) of one or more units of a process plant, the method comprising steps of:
   receiving, at a receiving module (108), a plurality of data of one or more industrial processing units, wherein the plurality of data comprising of characteristics of raw materials, characteristics of intermediate products, by-products and end products, process parameters, environmental parameters, market demand, availability of raw materials and condition of process equipment;
   merging, at a unit level fusion module (110), the received plurality of data to obtain unit-wise dataset of each of the one or more industrial processing units, wherein the unit-wise dataset of each processing unit comprising of a desired sampling frequency;
   verifying, at a verification module (112), the merged unit-wise dataset of the one or more industrial processing units, wherein presence of absurd values, percentage availability, standard deviation and inter-quartile range of all the variables of the processing unit are calculated;
   pre-processing, at a data pre-processing module (114), the verified plurality of data to obtain pre-processed dataset of each of the one or more industrial processing units, wherein the pre-processing is an iterative process comprising the steps of outlier removal, imputation of missing values and clustering;
   integrating, at an enterprise level fusion module (116), the pre-processed of each of the one or more industrial processing units with one or more values of simulated variables of one or more physics based models and one or more domain inputs from a user to obtain enterprise level dataset, wherein the unit-wise datasets are merged and synchronized taking into account the time lags due to residence times in various units, times of transportation of materials between one or more industrial processing units and response time of one or more sensors of the processing units;

identifying, at a regime identification module (118), one or more operating regimes using one or more clustering techniques on the enterprise level dataset, wherein one or more clustering techniques comprising of distance-based clustering, density based clustering and hierarchical clustering;

determining, at a baseline statistics module (120), ranges of one or more variables corresponding to the KPIs of the enterprise level dataset, based on predefined baseline statistics and the one or more operating regimes, wherein the determined ranges of one or more variables is being used to generate one or more plots of KPIs during the time period of analysis is being carried out;

selecting, at a feature selection module (122), one or more features or key variables of the enterprise level dataset to obtain a superset of one or more selected features of the enterprise level dataset, wherein the feature selection is performed on all the regime-wise datasets as well as the enterprise level dataset;

developing, at a model building module (124), one or more predictive models for each KPI, wherein the one or more predictive models using enterprise level dataset and the superset of one or more selected features of the enterprise level dataset; and optimizing, at an optimization module (126), at least one KPI based on one or more outputs, one or more predictive models and constraints on the one or more KPIs using one or more optimization techniques, wherein one or more optimization techniques includes gradient search, linear programming, goal programming, simulated annealing and evolutionary algorithms.

2. The method claimed in claim 1, wherein the pre-processing is performed on variables having a predefined percentage availability and predefined missingness pattern.

3. The method claimed in claim 1, wherein the integrating of the pre-processed plurality of data from one or more industrial units is based on a predefined baseline process unit.

4. The method claimed in claim 1, wherein the one or more plots includes trend plots of KPIs, box plots of the KPIs, scatter plots and heat maps.

5. The method claimed in claim 1, wherein the feature selection is carried out in two stages comprising:
  in the first stage, important features are obtained from one or more feature selection techniques, and
  in the second stage, features obtained from the first stage are ranked using geometric mean score method and combined to obtain a single superset of one or more features.

6. The method claimed in claim 5, wherein the feature of lower score of the one or more features selected in first stage is higher in relevance with respect to KPI.

7. The method claimed in claim 5, wherein the first stage of one or more feature selection techniques comprises of model based and non-model-based methods.

8. The method claimed in claim 1, wherein the features selection is performed on all regime-wise datasets as well as the enterprise level dataset.

9. The method claimed in claim 1, wherein the one or more outputs to the user from the data pre-processing module (114) include a list of discarded variables, number and percentage of outliers removed for every variable, technique used for imputing missing values in every variable, mean, median and standard deviation of every variable before and after pre-processing, and trend plots of all variables before and after pre-processing.

10. The method claimed in claim 1, wherein the one or more outputs to the user from the enterprise level fusion module (116) include list of simulated parameters, and the range, mean, median and standard deviation of all variables in the integrated dataset.

11. The method claimed in claim 1, wherein the one or more outputs to the user from the baseline statistics module (120) include the ranges of variables that correspond to desired and undesired ranges of KPIs, the ranges of KPIs at different productivity levels and the correlation coefficients between KPIs and other variables.

12. The method claimed in claim 1, wherein the one or more outputs to the user from the baseline statistics module (120) include trend plots and box plots of KPIs and other variables, scatter plots between KPIs and variables of interest, and heat maps of mean values of the KPIs.

13. The method claimed in claim 1, wherein the one or more outputs to the user from the feature selection module (122) include the superset of features and importance scores for regime-wise and integrated datasets, and parallel coordinate plots of the features.

14. The method claimed in claim 1, wherein the one or more outputs to the user from the model building and discrimination module include performance metrics for all predictive models, top three predictive models developed on the basis of root mean square error and mean absolute error, robustness scores for the top three models, sensitivity scores for all variables in robust models.

15. The method claimed in claim 1, wherein the one or more outputs to the user from the model building and discrimination module include trend plots of actual and predicted values of the KPI, scatter plots of the actual and predicted values of the KPI and residual plots of absolute error and all variables in robust models.

16. The method claimed in claim 1, wherein the one or more outputs to the user from the optimization module (126) include the values of variables that yield optimum KPIs, and optimum values of the KPIs and plots of pareto-optimal operating points.

17. A system (100) for analyzing a plurality of data from one or more industrial processing units for optimizing key performance indicators (KPIs) of one or more units of a process plant, the system comprising:
  a memory (104) with instructions;
  at least one processor (102) communicatively coupled with the memory;
  a plurality of interfaces (106), wherein the plurality of interfaces comprising of graphical user interface, server interface, a physics-based model interface and a solver interface;
  a receiving module (108) is configured to receive a plurality of data of one or more industrial processing units, wherein the plurality of data comprising of characteristics of raw materials, characteristics of intermediate, by-products and end products, process parameters and condition of process equipment;
  a unit level fusion module (110) is configured to merge the received plurality of data to obtain unit-wise dataset of each of the one or more industrial processing units, wherein the unit-wise dataset of each processing unit comprising of a desired sampling frequency;

a verification module (112) is configured to verify the merged unit-wise dataset of the one or more industrial processing units, wherein presence of junk values, percentage availability, standard deviation and inter-quartile range of all the variables of the processing unit are calculated;

a data pre-processing module (114) is configured to pre-process the verified plurality of data to obtain pre-processed dataset of each of the one or more industrial processing units, wherein the pre-processing is an iterative process comprising the steps of outlier removal, imputation of missing values and clustering;

an enterprise level fusion module (116) is configured to integrate the pre-processed of each of the one or more industrial processing units with one or more values of simulated variables of one or more physics based models and one or more domain inputs from a user to obtain enterprise level dataset, wherein the unit-wise datasets are merged and synchronized taking into account the time lags due to residence times in various units, times of transportation between one or more industrial processing units and response time of one or more sensors of the processing units;

a regime identification module (118) is configured to identify one or more operating regimes using one or more clustering techniques on the enterprise level dataset, wherein one or more clustering techniques comprising of distance-based clustering, density based clustering and hierarchical clustering;

a baseline statistics module (120) is configured to determine ranges of one or more variables corresponding to the KPIs of the enterprise level dataset, based on predefined baseline statistics and the one or more operating regimes, wherein the determined ranges of one or more variables is being used to generate one or more plots of KPIs during the time period of analysis is being carried out;

a feature selection module (122) is configured to select one or more features of the enterprise level dataset to obtain a superset of one or more selected features of the enterprise level dataset, wherein the feature selection is performed on all the regime-wise datasets as well as the enterprise level dataset;

a model building module (124) is configured to consider one or more predictive models for each KPI, wherein the one or more predictive models using enterprise level dataset and the superset of one or more selected features of the enterprise level dataset;

an optimization module (126) is configured to optimize at least one KPI based on one or more outputs, one or more predictive models and constraints on the one or more KPIs using one or more optimization techniques, wherein one or more optimization techniques includes gradient search, linear programming, simulated annealing and evolutionary algorithms.

18. The system (100) claimed in claim 17, wherein the one or more physics-based models is used for calculation of one or more simulated variables.

19. One or more non-transitory machine-readable information storage mediums comprising one or more instructions which when executed by one or more hardware processors perform actions comprising:

receiving, at a receiving module (108), a plurality of data of one or more industrial processing units, wherein the plurality of data comprising of characteristics of raw materials, characteristics of intermediate products, by-products and end products, process parameters, environmental parameters, market demand, availability of raw materials and condition of process equipment;

merging, at a unit level fusion module (110), the received plurality of data to obtain unit-wise dataset of each of the one or more industrial processing units, wherein the unit-wise dataset of each processing unit comprising of a desired sampling frequency;

verifying, at a verification module (112), the merged unit-wise dataset of the one or more industrial processing units, wherein presence of absurd values, percentage availability, standard deviation and inter-quartile range of all the variables of the processing unit are calculated;

pre-processing, at a data pre-processing module (114), the verified plurality of data to obtain pre-processed dataset of each of the one or more industrial processing units, wherein the pre-processing is an iterative process comprising the steps of outlier removal, imputation of missing values and clustering;

integrating, at an enterprise level fusion module (116), the pre-processed of each of the one or more industrial processing units with one or more values of simulated variables of one or more physics based models and one or more domain inputs from a user to obtain enterprise level dataset, wherein the unit-wise datasets are merged and synchronized taking into account the time lags due to residence times in various units, times of transportation of materials between one or more industrial processing units and response time of one or more sensors of the processing units;

identifying, at a regime identification module (118), one or more operating regimes using one or more clustering techniques on the enterprise level dataset, wherein one or more clustering techniques comprising of distance-based clustering, density based clustering and hierarchical clustering;

determining, at a baseline statistics module (120), ranges of one or more variables corresponding to the KPIs of the enterprise level dataset, based on predefined baseline statistics and the one or more operating regimes, wherein the determined ranges of one or more variables is being used to generate one or more plots of KPIs during the time period of analysis is being carried out;

selecting, at a feature selection module (122), one or more features or key variables of the enterprise level dataset to obtain a superset of one or more selected features of the enterprise level dataset, wherein the feature selection is performed on all the regime-wise datasets as well as the enterprise level dataset;

developing, at a model building module (124), one or more predictive models for each KPI, wherein the one or more predictive models using enterprise level dataset and the superset of one or more selected features of the enterprise level dataset; and optimizing, at an optimization module (126), at least one KPI based on one or more outputs, one or more predictive models and constraints on the one or more KPIs using one or more optimization techniques, wherein one or more optimization techniques includes gradient search, linear programming, goal programming, simulated annealing and evolutionary algorithms.

* * * * *